United States Patent
Mastierov et al.

(10) Patent No.: US 9,892,384 B2
(45) Date of Patent: *Feb. 13, 2018

(54) EXTRACTING PRODUCT PURCHASE INFORMATION FROM ELECTRONIC MESSAGES

(71) Applicant: Slice Technologies, Inc., San Mateo, CA (US)

(72) Inventors: Ievgen Mastierov, Mountain View, CA (US); Conal Sathi, Mountain View, CA (US)

(73) Assignee: Slice Technologies, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/422,999

(22) Filed: Feb. 2, 2017

(65) Prior Publication Data

US 2017/0147994 A1    May 25, 2017

Related U.S. Application Data

(63) Continuation of application No. 14/519,919, filed on Oct. 21, 2014, now Pat. No. 9,563,904.

(51) Int. Cl.
*G06F 17/22* (2006.01)
*G06F 17/27* (2006.01)
(Continued)

(52) U.S. Cl.
CPC ..... *G06Q 20/0453* (2013.01); *G06F 17/2229* (2013.01); *G06F 17/271* (2013.01); *G06F 17/3071* (2013.01); *G06Q 30/0204* (2013.01)

(58) Field of Classification Search
CPC ............ G06Q 30/0255; G06F 17/2229; G06F 17/3071; G06F 17/271
See application file for complete search history.

(56) References Cited

U.S. PATENT DOCUMENTS 5,664,109 A    9/1997  Johnson et al.
7,783,515 B1 *  8/2010  Kumar ................... G06Q 10/10
                                                        705/16

(Continued)

FOREIGN PATENT DOCUMENTS

JP         2002014681 A      1/2002
KR      1020140138512 A     12/2014

*Primary Examiner* — Jorge A Casanova
(74) *Attorney, Agent, or Firm* — Law Office of Edouard Garcia

(57) ABSTRACT

Improved systems and methods for extracting product purchase information from electronic messages transmitted between physical network nodes to convey product purchase information to designated recipients. These examples provide a product purchase information extraction service that is able to extract product purchase information from electronic messages with high precision across a wide variety of electronic message formats and thereby solve the practical problems that have arisen as a result of the proliferation of different electronic message formats used by individual merchants and across different merchants and different languages. In this regard, these examples are able to automatically learn the structures and semantics of different message formats, which accelerates the ability to support new message sources, new markets, and different languages.

20 Claims, 17 Drawing Sheets

(51) Int. Cl.
*G06F 17/30* (2006.01)
*G06Q 20/04* (2012.01)
*G06Q 30/02* (2012.01)

(56) References Cited

U.S. PATENT DOCUMENTS

| | | | |
|---|---|---|---|
| 8,458,054 B1 | 6/2013 | Thakur | |
| 8,527,436 B2* | 9/2013 | Salaka | G06Q 10/107 706/13 |
| 2002/0052847 A1 | 5/2002 | Shioda et al. | |
| 2002/0174185 A1* | 11/2002 | Rawat | G06Q 10/107 709/206 |
| 2003/0105681 A1* | 6/2003 | Oddo | G06Q 30/02 705/26.62 |
| 2005/0055290 A1 | 3/2005 | Bross et al. | |
| 2006/0088214 A1 | 4/2006 | Handley et al. | |
| 2008/0288486 A1 | 11/2008 | Kim et al. | |
| 2009/0089209 A1* | 4/2009 | Bixler | G06Q 20/102 705/40 |
| 2009/0313132 A1 | 12/2009 | McKenna et al. | |
| 2012/0047014 A1* | 2/2012 | Smadja | G06Q 30/02 705/14.53 |
| 2012/0203632 A1* | 8/2012 | Blum | G06Q 30/0255 705/14.53 |
| 2012/0330971 A1* | 12/2012 | Thomas | G06F 17/30663 707/748 |
| 2013/0024282 A1* | 1/2013 | Kansal | G06Q 30/01 705/14.53 |
| 2013/0024525 A1* | 1/2013 | Brady | G06Q 10/08 709/206 |
| 2013/0024924 A1* | 1/2013 | Brady | G06Q 10/107 726/7 |
| 2013/0124376 A1* | 5/2013 | Lefebvre | G06Q 20/102 705/34 |
| 2013/0151631 A1* | 6/2013 | Jensen | H04L 51/18 709/206 |
| 2014/0067633 A1 | 3/2014 | Venkatasubramanian et al. | |
| 2015/0235166 A1* | 8/2015 | Brady | G06Q 10/083 705/330 |
| 2015/0235301 A1* | 8/2015 | Brady | G06Q 30/0635 705/26.81 |

* cited by examiner

Dear Eugene,

Thank you for placing your order with Advance Auto Parts.
Most orders are processed and shipped within one business day.
We'll send you a tracking number once your item has been shipped.

Order Number: #1925391

Order Summary
Product Subtotal: $83.97
Discounts: -$30.00
Shipping Charges: $0.00
Tax: $3.64
Total: $57.61

WeareverBrake Rotor - Rear
Part No 10-0623YF
1 YEAR REPLACEMENT IF DEFECTIVE
1
Product Price $20.99
Discount -$7.50
$20.99

WagnerThermoQuiet Brake Pads - Rear
Part No QC537
LIMITED LIFETIME REPLACEMENT
1
Product Price $41.99
Discount -$15.00
$41.99

FIG. 3A

34 — Dear Eugene,

36 — Thank you for placing your order with Advance Auto Parts.
Most orders are processed and shipped within one business day.
We'll send you a tracking number once your item has been shipped.

38 — Order Number: #1925391

40 — Order Summary
42 — Product Subtotal: $83.97
44 — Discounts: -$30.00
46 — Shipping Charges: $0.00
48 — Tax: $3.64
50 — Total: $57.61

52 — WeareverBrake Rotor - Rear
Part No 10-0623YF
1 YEAR REPLACEMENT IF DEFECTIVE
1
54 — Product Price $20.99
56 — Discount -$7.50
$20.99

*ITERATION 1*

58 — WagnerThermoQuiet Brake Pads - Rear
Part No QC537
LIMITED LIFETIME REPLACEMENT
1
60 — Product Price $41.99
62 — Discount -$15.00
$41.99

*ITERATION 2*

FIG. 3B

Dear Conal,

Thank you for placing your order with Advance Auto Parts.
Most orders are processed and shipped within one business day.
We'll send you a tracking number once your item has been shipped.

Order Number: #2872994

Order Summary
Product Subtotal: $105.78
Discounts: -$40.00
Shipping Charges: $0.00
Tax: $4.60
Total: $70.38

Brute Force Universal Joint
Part No 2-0631BF
LIMITED LIFETIME REPLACEMENT
1
Product Price $19.79
Discount -$7.48
$19.79

Mobil1 Synthetic Gear Lubricant LS 75W-90 (1 qt.)
Part No 98W573
30 DAY REPLACEMENT IF DEFECTIVE
4
Product Price $10.89
Discount -$4.12
$43.56

FIG. 6A

Dear Conal,

Thank you for placing your order with Advance Auto Parts.
Most orders are processed and shipped within one business day.
We'll send you a tracking number once your item has been shipped.

Order Number: #*INT*

Order Summary
Product Subtotal: $*FLOAT*
Discounts: -$*FLOAT*
Shipping Charges: $*FLOAT*
Tax: $*FLOAT*
Total: $*FLOAT*

Brute Force Universal Joint
Part No *INT-INTBF*
LIMITED LIFETIME REPLACEMENT
*INT*
Product Price $*FLOAT*
Discount -$*FLOAT*
$*FLOAT*

Mobil/*INT* Synthetic Gear Lubricant LS *INTW-INT* (*INT* qt.)
Part No *INTWINT*
*INT* DAY REPLACEMENT IF DEFECTIVE
*INT*
Product Price $*FLOAT*
Discount -$*FLOAT*
$*FLOAT*

FIG. 6B

Dear Eugene,

Thank you for placing your order with Advance Auto Parts.
Most orders are processed and shipped within one business day.
We'll send you a tracking number once your item has been shipped.

Order Number: #1925391

Order Summary
Product Subtotal: $83.97
Discounts: -$30.00
Shipping Charges: $0.00
Tax: $3.64
Total: $57.61

WeareverBrake Rotor - Rear
Part No 10-0623YF
1 YEAR REPLACEMENT IF DEFECTIVE
1
Product Price $20.99
Discount -$7.50
$20.99

WagnerThermoQuiet Brake Pads - Rear
Part No QC537
LIMITED LIFETIME REPLACEMENT
1
Product Price $41.99
Discount -$15.00
$41.99

Dear Eugene,

Thank you for placing your order with Advance Auto Parts.
Most orders are processed and shipped within one business day.
We'll send you a tracking number once your item has been shipped.

Order Number: #*INT*

Order Summary
Product Subtotal: $*FLOAT*
Discounts: -$*FLOAT*
Shipping Charges: $*FLOAT*
Tax: $*FLOAT*
Total: $*FLOAT*

WeareverBrake Rotor - Rear
Part No *INT-INTYF*
*INT* YEAR REPLACEMENT IF DEFECTIVE
*INT*
Product Price $*FLOAT*
Discount -$*FLOAT*
$*FLOAT*

WagnerThermoQuiet Brake Pads - Rear
Part No QC*INT*
LIMITED LIFETIME REPLACEMENT
*INT*
Product Price $*FLOAT*
Discount -$*FLOAT*
$*FLOAT*

Dear Eugene, —184

Thank you for placing your order with Advance Auto Parts.
Most orders are processed and shipped within one business day.
We'll send you a tracking number once your item has been shipped.

Order Number: #1925391 —186

Order Summary
Product Subtotal: $83.97 —188
Discounts: -$30.00 —190
Shipping Charges: $0.00 —192
Tax: $3.64 —194
Total: $57.61 —196

WeareverBrake Rotor - Rear —198
Part No 10-0623YF —200
1 YEAR REPLACEMENT IF DEFECTIVE —201
1 —202
Product Price $20.99 —204
Discount -$7.50 —206
$20.99 —208

WagnerThermoQuiet Brake Pads - Rear —210
Part No QC537 —212
LIMITED LIFETIME REPLACEMENT —214
1 —216
Product Price $41.99 —218
Discount -$15.00 —220
$41.99 —222

FIG. 9E

Presentation Of Aggregated Product Purchase Information For Consumer A — 1230

| Order Date | Item Description | Price | Merchant | Status |
|---|---|---|---|---|
| May 25, 2011 | Ipod 2 tablet computing device (Order No. 123456) | $499.00 | Apple | Shipped |
| May 23, 2011 | Canon digital camera model no. 712 (Order No. 987654) | $217.99 | Amazon | Ordered |
| May 19, 2011 | Nike running shoes model no. XYZ (Order No. MNZ12ZY) | $113.99 | Nike Store | Delivered |
| May 11, 2011 | "Successful Startups" book by Bill Gates (Order No. 12ABC34) | $14.99 | Amazon | Delivered |

FIG. 10

EXTRACTING PRODUCT PURCHASE INFORMATION FROM ELECTRONIC MESSAGES

CROSS-REFERENCE TO RELATED APPLICATIONS

This application is a continuation of U.S. patent application Ser. No. 14/519,919, filed Oct. 21, 2014, the disclosure of which is incorporated herein by reference.

BACKGROUND

People purchase products from many different merchants using a variety of different payment options. The transactions for these purchases typically are confirmed by physical in-store receipts or by electronic messages addressed to the purchasers' messaging accounts (e.g., a purchaser's electronic mail account). The large number and diversity of confirmation types makes it difficult for people to track their purchases and obtain a comprehensive understanding of their purchase histories.

In addition, the large diversity of merchants from which people purchase products makes it difficult for merchants to obtain sufficient purchase history data to develop accurate customer profiles. Even assuming that a person uses a common identifier (e.g., a loyalty card or credit card) for all his or her purchases, these purchases typically are tracked only by the merchant that issued the identifier to the customer. This lack of information about the customer limits a merchant's ability to effectively target its promotions in ways that will encourage them to purchase the merchant's product offerings.

The large diversity of merchants also leads to a large diversity in confirmation formats, making it difficult and expensive to extract product purchase information from purchase confirmations.

DESCRIPTION OF DRAWINGS

FIG. 3A is a diagrammatic view of an example of an electronic message.

FIG. 3B is a diagrammatic view of the electronic message of FIG. 3A showing data fields that have been identified according to an example of a product purchase information extraction process.

FIG. 6A is a diagrammatic view of an example of a set of electronic messages.

FIG. 6B is a diagrammatic view of the set of electronic messages of FIG. 6A after being pre-processed.

FIG. 9A is a diagrammatic view of an example of an electronic message.

FIG. 9B is a diagrammatic view of an example of the electronic message of FIG. 9A after being pre-processed.

FIG. 9E is a diagrammatic view of an example of a visualization of the electronic message of FIG. 9A showing data fields that are identified in the syntax tree shown in FIG. 9D.

FIG. 10 is a diagrammatic view of an example of a graphical user interface presenting aggregated product purchase information.

DETAILED DESCRIPTION

Figure 1:
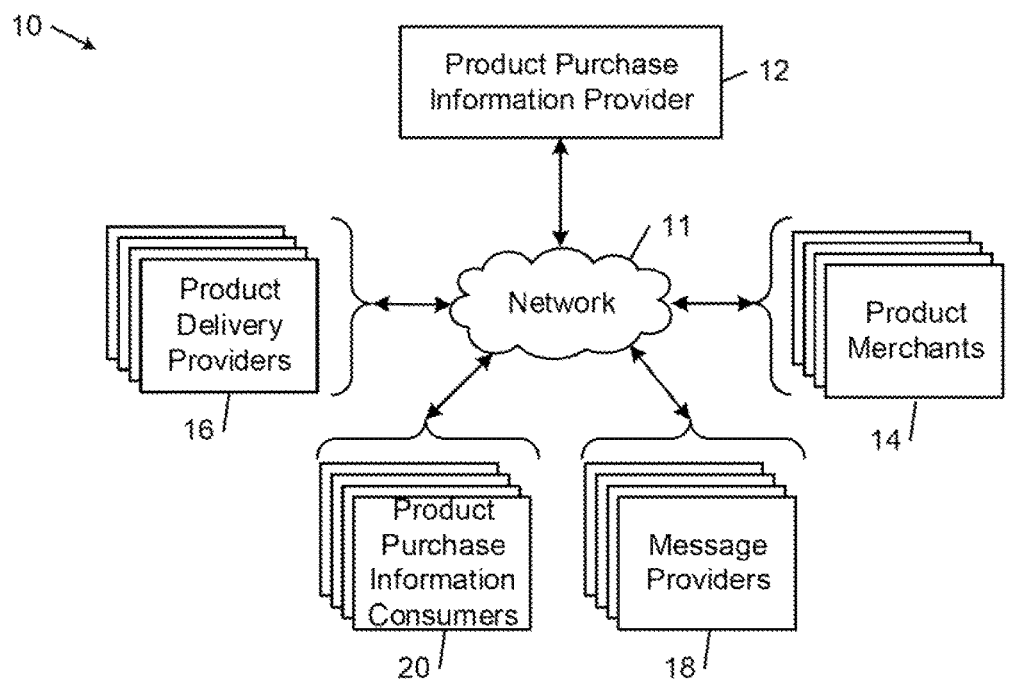
FIG. 1 is a diagrammatic view of an example of a network communication environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

1. Definition of Terms

A "product" is any tangible or intangible good or service that is available for purchase or use.

"Product purchase information" is information related to the purchase of a product. Product purchase information includes, for example, purchase confirmations (e.g., receipts), product order information (e.g., merchant name, order number, order date, product description, product name, product quantity, product price, sales tax, shipping cost, and order total), and product shipping information (e.g., billing address, shipping company, shipping address, estimated shipping date, estimated delivery date, and tracking number).

An "electronic message" is a persistent text based information record sent from a sender to a recipient between physical network nodes and stored in non-transitory computer-readable memory. An electronic message may be structured message (e.g., a hypertext markup language (HTML) message that includes structured tag elements) or unstructured (e.g., a plain text message).

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" (also referred to as "memory") refers to any tangible, non-transitory device capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "network node" (also referred to simply as a "node") is a physical junction or connection point in a communications network. Examples of network nodes include, but are not limited to, a terminal, a computer, and a network switch. A "server node" is a network node that responds to requests for information or service. A "client node" is a network node that requests information or service from a server node.

As used herein, the term "includes" means includes but not limited to, the term "including" means including but not limited to. The term "based on" means based at least in part on.

2. Extracting Product Purchase Information from Electronic Messages

A. Introduction

The examples that are described herein provide improved systems and methods for extracting product purchase information from electronic messages transmitted between physical network nodes to convey product purchase information to designated recipients by solving practical problems that have arisen as a result of the proliferation of different electronic message formats used by individual merchants and across different merchants and different languages. These examples provide a product purchase information extraction service that is able to extract product purchase information from electronic messages with high precision across a wide variety of electronic message formats. In this regard, these examples are able to automatically learn the structures and semantics of different message formats, which accelerates the ability to support new message sources, new markets, and different languages.

By these improved systems and methods, product purchase information can be extracted from a wide variety of electronic message types and aggregated to provide individuals with enhanced tools for visualizing and organizing their purchase histories and to provide merchants and other organizations improved cross-merchant purchase graph information across different consumer demographics to enable targeted and less intrusive advertising and other marketing strategies. These improved systems and methods can be deployed to monitor consumer purchases over time to obtain updated purchase history information that can be aggregated for an individual consumer or across many consumers to provide actionable information that directs consumer behavior and organizational marketing strategies. For example, these improved systems and methods can organize disparate product purchase information extracted from individual electronic messages into actionable data that can be used by a consumer to organize her prior purchases and enhance her understanding of her purchasing behavior and can be used by merchants and other organizations to improve the accuracy and return-on-investment of their marketing campaigns.

In specific examples, these systems and methods include improved special purpose computer apparatus programmed to build a structure learning parser that automatically learns the structure of an electronic message and accurately parses product purchase information from the electronic message. These systems and methods also include improved special purpose computer apparatus programmed to function as a structure learning parser that automatically learns the structure of an electronic message and accurately parses product purchase information from the electronic message.

B. Exemplary Operating Environment

FIG. 1 shows an example of a network communications environment 10 that includes a network 11 that interconnects a product purchase information provider 12, one or more product merchants 14 that sell products, one or more product delivery providers 16 that deliver purchased products to purchasers, one or more message providers 18 that provide message handling services, and one or more product purchase information consumers 20 that purchase product purchase information and services from the product purchase information provider 12.

The network 11 may include any of a local area network (LAN), a metropolitan area network (MAN), and a wide area network (WAN) (e.g., the internet). The network 11 typically includes a number of different computing platforms and transport facilities that support the transmission of a wide variety of different media types (e.g., text, voice, audio, and video) between network nodes 14 and the product provider 18. Each of the product purchase information provider 12, the product merchants 14, the product delivery providers 16, the message providers 18, and the product purchase information consumers 20 typically connects to the network 11 via a network node (e.g., a client computer or a server computer) that includes a tangible computer-readable memory, a processor, and input/output (I/O) hardware (which may include a display).

One or more of the product merchants 14 typically allow consumers and businesses to directly purchase products over the network 11 using a network enabled software application, such as a web browser. One or more of the of the product merchants 14 also may allow consumers and businesses to purchase products in a physical retail establishment. In either case, after a product purchase transaction has been completed, a product merchant may send a product purchase confirmation electronic message to a messaging address associated with the purchaser. The product purchase confirmation message may include, for example, product order information such as merchant name, order number, order date, product description, product name, product quantity, product price, sales tax, shipping cost, and order total. The product merchant also may arrange to have the product delivered by one of the product delivery providers 16. Depending on the type of product that was purchased, the product delivery provider 16 may deliver the product to the purchaser physically or electronically. In either case, the product delivery provider 16 or the product merchant 14 may send a delivery notification electronic message to the messaging address associated with the purchaser. The delivery notification electronic message may include, for example, product shipping information such as product order information, billing address, shipping company, shipping address, estimated shipping date, estimated delivery date, and tracking number.

In general, the purchaser's messaging address may be any type of network address to which electronic messages may be sent. Examples of such messaging addresses include electronic mail (e-mail) addresses, text messaging addresses (e.g., a sender identifier, such as a telephone number or a user identifier for a texting service), a user identifier for a social networking service, and a facsimile telephone number. The product purchase related electronic messages typically are routed to the purchaser through respective ones of the message providers 18 associated with the purchaser's messaging address. The message providers 18 typically store the purchasers' electronic messages in respective message folder data structures in a database.

The product purchase information provider 12 extracts product purchase information from the electronic messages of product purchasers. In some examples, the product purchase information provider 12 obtains authorization from the product purchasers to access their respective message folders that are managed by the message providers 18. In other examples, product purchasers allow the product purchase information provider 12 to access their electronic messages that are stored on their local communication devices (e.g., personal computer or mobile phone).

Figure 2:
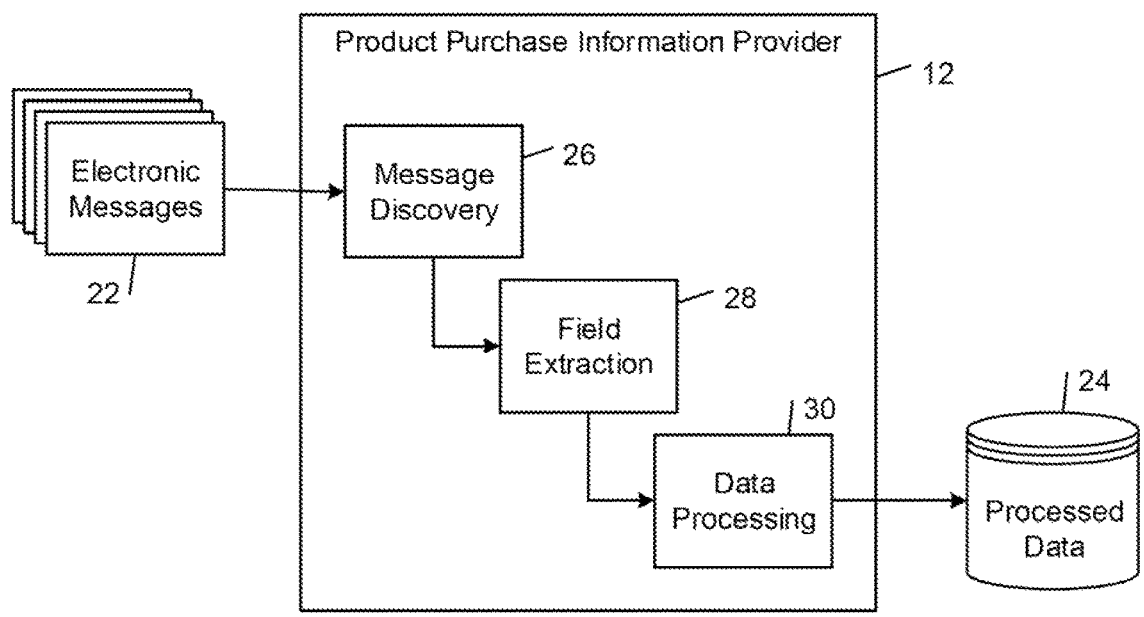
FIG. 2 is a diagrammatic view of electronic message processing stages performed by an example of a product purchase information provider.

Referring to FIG. 2, after obtaining authorization to access the electronic messages 22 of a purchaser, the product purchase information provider 12 processes the electronic messages 22 through a number of stages before producing processed data 24 that is provided to the product purchase information consumers 20. These stages include a message discovery stage 26, a field extraction stage 28, and a data processing stage 30.

In the message discovery stage 26, the product purchase information provider 12 identifies the ones of the electronic messages 22 that relate to product purchases. In some examples, rule-based filters and machine learning classifiers are used to identify product purchase related electronic messages.

In the field extraction stage 28, the product purchase information provider 12 extracts product purchase information from the identified ones of the electronic messages 22. Examples of such product purchase information include merchant name, order number, order date, product description, product name, product quantity, product price, sales tax, shipping cost, order total, billing address, shipping company, shipping address, estimated shipping date, estimated delivery date, and tracking number.

In the data processing stage 30, the product purchase information provider 12 processes the extracted product purchase information for according to the different types of product purchase information consumers. For example, for individual users, the extracted product purchase information is processed, for example, to display information about the users' purchases, including information for tracking in-transit orders, information for accessing purchase details, and aggregate purchase summary information. For advertisers, the extracted product purchase information is processed, for example, to assist in targeting advertising to consumers based on their purchase histories. For market analysts, the extracted product purchase information is processed to provide, for example, anonymous item-level purchase detail across retailers, categories, and devices.

C. Extracting Product Purchase Information

I. Introduction

In the examples explained in detail below, the product purchase information provider 12 includes a structure learning parser that extracts product purchase information from an electronic message using a grammar based parsing approach to identify structural elements and data fields in the electronic message and a machine learning approach to classify the data fields. The structural elements correspond to static, optional, and iterating elements that commonly appear in a particular type of product purchase related electronic message, whereas the data fields contain the variable information at least some of which corresponds to the product purchase information that is extracted.

FIG. 3A shows an example of an electronic message 32 for a product order, and FIG. 3B shows the electronic message 32 with data fields (marked with bold font) that have been identified according to an example of a product purchase information extraction process. In this example, the structural elements are: an introductory "Dear" 36; standard informational text 36 (i.e., "Thank you for placing your order . . . once your item has been shipped."); "Order Number:" 38; "Order Summary" 40; "Product Subtotal:" 42; "Discounts:"; "Shipping Charges:" 46; "Tax:" 48; "Total:" 50; "Part No" 52; "Product Price" 54; "Discount" 56; "Part No" 58; "Product Price" 60; and "Discount" 62. The structural elements 34-50 are static elements and the sets of structural elements 52-56 and 58-62 include the same static elements that repeat in respective iterating elements. The non-structural elements (e.g., prices, order number, and part numbers) of the electronic message are data fields that are extracted and classified by the structure learning parser component of the product purchase information provider 12.

II. Building a Structure Learning Parser

Figure 4:
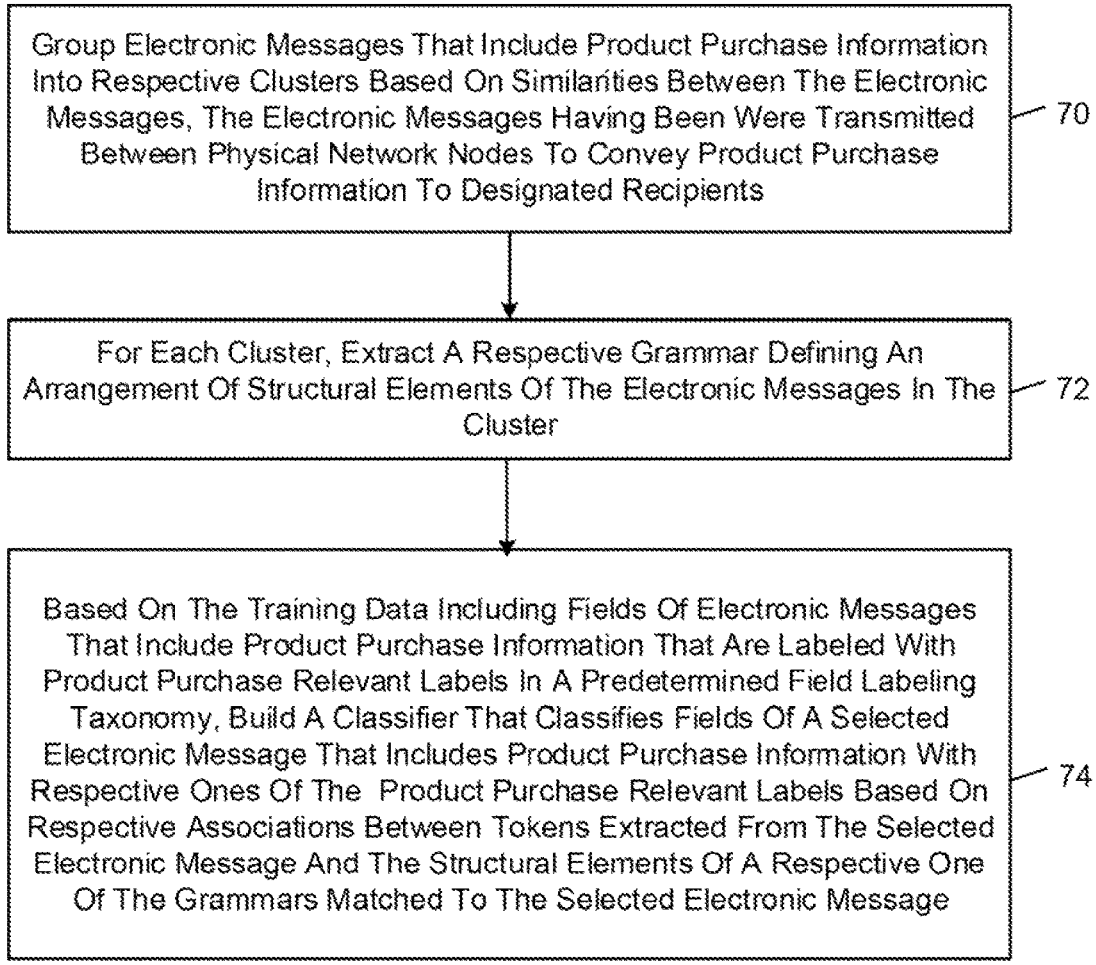
FIG. 4 is a flow diagram of an example of a process of training a structure learning parser for labeling data fields of an electronic message.

FIG. 4 shows an example of a method of building a structure learning parser that extracts product purchase information from an electronic message. In the illustrated examples, computer apparatus is programmed to perform the method of FIG. 4.

In accordance with the method of FIG. 4, the computer apparatus groups electronic messages into respective clusters based on similarities between the electronic messages, the electronic messages having been transmitted between physical network nodes to convey product purchase information to designated recipients (FIG. 4, block 70). For each cluster, the computer apparatus extracts a respective grammar defining an arrangement of structural elements of the electronic messages in the cluster (FIG. 4, block 72). Based on training data that includes fields of electronic messages comprising product purchase information that are labeled with product purchase relevant labels in a predetermined field labeling taxonomy, the computer apparatus builds a classifier that classifies fields of a selected electronic message that includes product purchase information with respective ones of the product purchase relevant labels based on respective associations between tokens extracted from the selected electronic message and the structural elements of a respective one of the grammars matched to the selected electronic message (FIG. 4, block 74). The computer apparatus typically stores the grammars and the classifier in non-transitory computer-readable memory in one or more data structures permitting computer-based parsing of product purchase information from electronic messages.

In some examples, a structure learner parser builder includes a product purchase information grammar extractor that performs the grouping and extracting operations of blocks 70-72 of FIG. 4, and a product purchase information token classifier trainer that performs the classifier building operation of block 74 of FIG. 4. In some examples, the structure learner parser builder is a software application that programs a computer to perform the grouping and extracting operations of blocks 70-72 implements the product purchase information grammar extractor, where a different respective software module includes a respective set of computer-readable instructions for performing the grouping and extracting operations. In some examples, the product purchase information token classifier trainer is a machine learning training software application that programs a computer to perform the classifier building operation of block 74.

Figure 5:
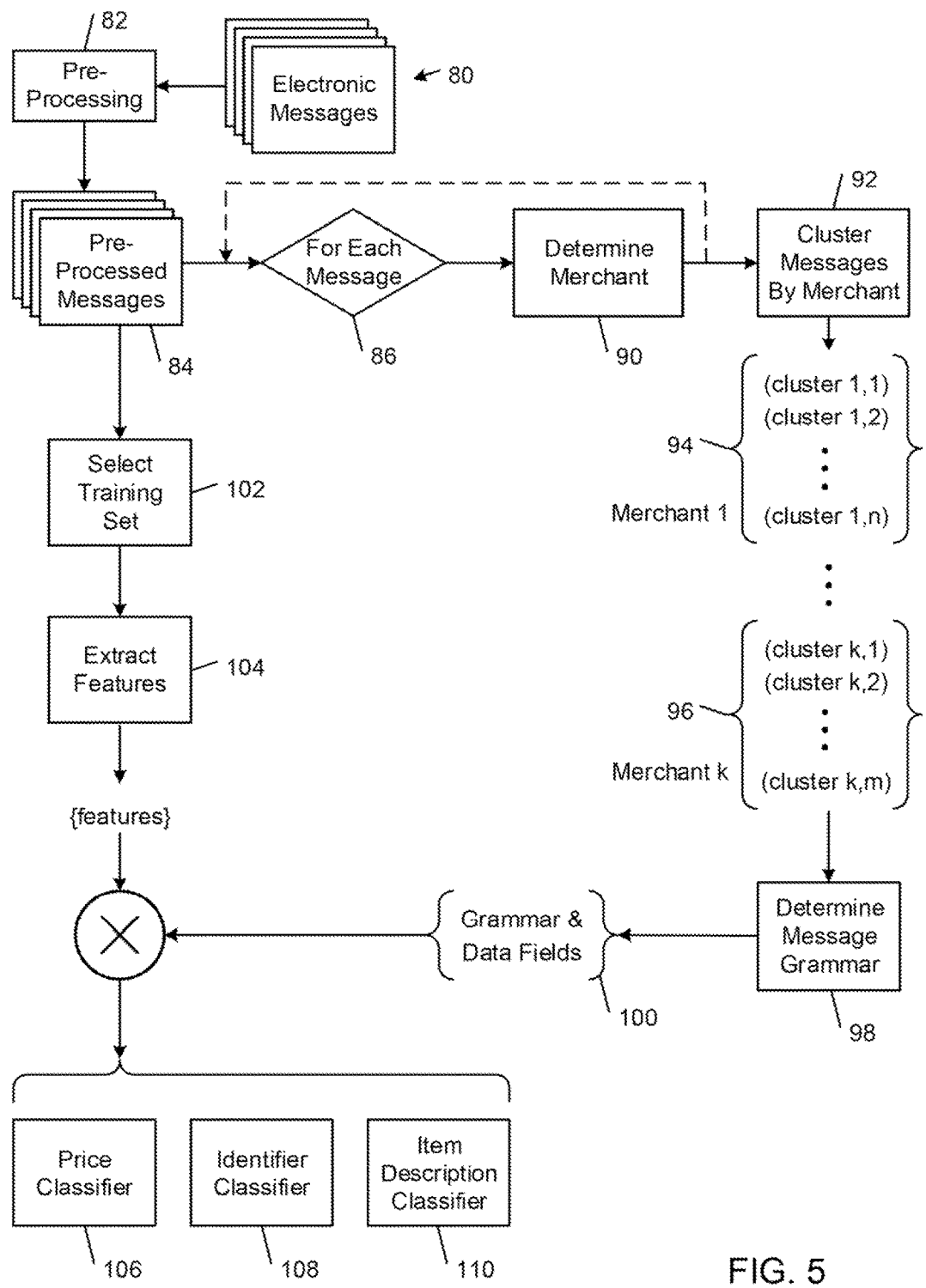
FIG. 5 is a flow diagram of an example of the structure learning parser training process of FIG. 4.

FIG. 5 shows a flow diagram of an example of the structure learning parser building process of FIG. 4.

In this example, the computer apparatus retrieves from a data store (e.g., a database) electronic messages 80 that have been transmitted between physical network nodes to convey product purchase information to designated recipients. FIG. 6A shows an example 81 of one of the electronic messages 80.

The computer apparatus pre-processes the electronic messages 80 (FIG. 5, block 82). In this process, the computer apparatus tokenizes the text-based contents of the electronic messages by extracting contiguous strings of symbols (e.g., symbols representing alphanumeric characters) separated by white spaces. The contiguous symbol strings typically correspond to words and numbers. The computer apparatus then replaces tokens that match patterns for integers and real numbers (typically prices) in the electronic messages 80 with wildcard tokens. FIG. 6B shows an example of a pre-processed version 83 of the electronic message 81 in which integers have been replaced with the wildcard token "INT" and real numbers have been replaced with the wildcard token "FLOAT". The replacement of the variable integer and real number elements of each electronic message with wildcard tokens improves the detection of iterating elements of the electronic messages.

For each of the pre-processed messages 84 (FIG. 5, block 86), the computer apparatus attempts to determine a merchant that is associated with the electronic message (FIG. 5, block 90). For some types of electronic messages, the computer apparatus attempts to determine the merchant from header information that includes supplemental information about the electronic message. For example, an electronic mail (e-mail) message includes header information that indicates the sender, the recipient, and the subject of the electronic mail message, and a text message typically includes a Sender ID that indicates the sender of the message. In some cases, the computer apparatus may be able to determine the merchant from the sender or subject contained in the header information. In some cases, the computer apparatus may attempt to determine the merchant from the content of the electronic message.

The computer apparatus clusters the electronic messages by merchant (FIG. 5, block 92). In this process, the computer apparatus sorts the electronic messages into groups by message sender, where each message sender is associated with a respective one of the groups of electronic messages. For each group of merchant-specific electronic messages, the computer apparatus clusters the electronic messages within the group into one or more clusters based on similarities between the electronic messages. The result is a respective set 94, 96 of clusters (cluster 1,1 . . . cluster 1,$n$, . . . , cluster k,1 . . . cluster k,m) for each merchant, where each cluster consists of electronic messages that are similar to one another.

In some examples, for each merchant-specific set of electronic messages, the computer apparatus applies to the electronic messages a clustering process (e.g., a Density-Based Spatial Clustering of Applications with Noise (DB-SCAN) process, a k-means clustering process, or a hierarchical clustering process) that clusters electronic messages based on measures of content similarity between pairs of the electronic messages. In an example of this process, electronic messages are processed serially. A new cluster is created for the first electronic message. Each successive electronic message to be clustered is compared to each of the electronic messages in each existing cluster and is added to the cluster containing an electronic message having a similarity with the electronic message being clustered that exceeds a similarity threshold; if the electronic message being clustered has a similarity that exceeds the similarity threshold with the electronic messages of multiple clusters, the multiple clusters are merged into a single cluster. If the similarities between the electronic message being clustered and the previously clustered electronic messages do not exceed the similarity threshold, a new cluster is created for the electronic message being clustered.

In some examples, measures of content similarity compare similarity and diversity of the contents of pairs of electronic messages. In some of these examples, the similarity measure corresponds to the Jaccard similarity coefficient, which measures similarity between two electronic messages based on the size of the intersection divided by the size of the union of features of the electronic messages. In some of these examples, the computer apparatus extracts lines of content (i.e., whole lines, as opposed to individual words in the lines) from each electronic message as the features that are compared, and measures similarities between electronic messages using line-based comparisons of the extracted content. This line-based feature matching approach improves the accuracy of the clustering process by narrowing the range of matches between electronic messages.

After the electronic messages have been grouped into the merchant-specific sets 94, 96 of electronic message clusters, the computer apparatus determines a respective grammar and set of data fields 100 for each electronic message cluster (FIG. 5, block 98).

In some examples, for each cluster, the computer apparatus builds a respective generalized suffix tree representation of contents of the electronic messages in the cluster, and ascertains the arrangement of structural elements of the electronic messages in the cluster based on the respective generalized suffix tree representation. The suffix tree representation contains all the suffixes (which are one or more word sequences that are referred to as "phrases") as their keys and positions in the text as their values. The suffix tree representation maintains the order of suffixes in a hierarchical tree structure of nodes that are linearly interconnected from root to leaf node and, for each, suffix, identifies the electronic messages in which the suffix appears and the number of times it appears in each electronic message. In some examples, the suffix tree representation of the electronic messages in a given cluster is built by applying Ukkonen's algorithm for constructing suffix trees (E. Ukkonen, "On-Line Construction of Suffix Trees," Algorithmica, September 1995, Volume 14, Issue 3, pp. 249-260 (1995)) to a single string formed by concatenating the tokenized contents of all the electronic messages in the given cluster.

Figure 6C:
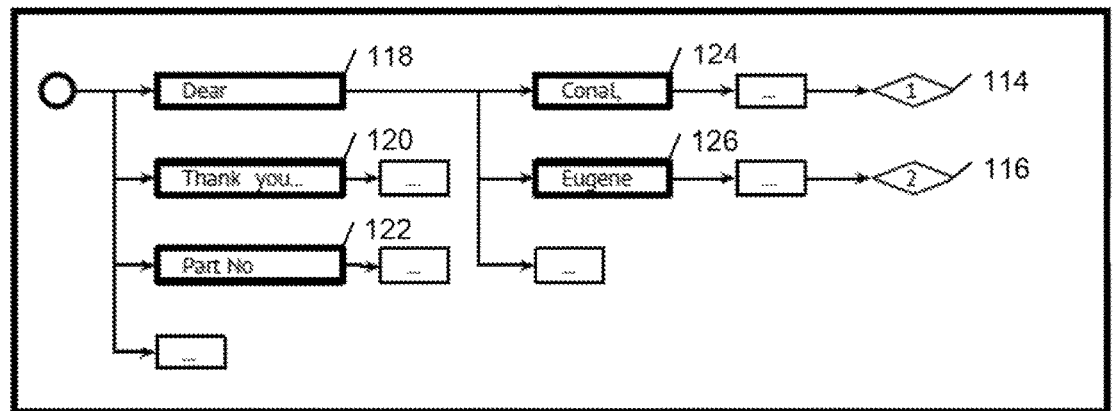
FIG. 6C is a diagrammatic view of a generalized suffix tree representation of contents of respective ones of the pre-processed electronic messages of FIG. 6B.

FIG. 6C shows a diagrammatic view of an example of a generalized suffix tree 112 representation of the contents of respective ones of the pre-processed electronic messages 84 in a particular merchant-specific cluster (see FIG. 6B). In this example, the bolded nodes 118-126 correspond to static elements that are common to all the electronic messages in a given cluster and the leaves 114, 116 demarcate the ends of respective ones of the electronic messages.

The computer apparatus traverses the generalized suffix tree to identify structural elements of the electronic messages in a given cluster. In some examples, the computer identifies substrings that correspond to static elements, optional elements, and iterating elements in the electronic messages of the given cluster. In general, substrings that appear in all the electronic messages in the given cluster are considered static elements, substrings that appear in a majority (e.g., 90%) of the electronic messages in the given cluster are considered optional elements, and substrings that appear in all the electronic messages in the given cluster and sometimes repeat within individual ones of the electronic messages are considered iterating elements. Substrings that appear in less than a majority (e.g., below 10%) of the electronic messages of a given cluster are considered electronic message specific elements that are extracted as data fields.

The computer apparatus typically applies a series of processes to the tree to detect structural elements of the electronic messages in a given cluster. These processes operate on branches and the special characters that terminate the branches to represent respective ones of the electronic messages in the given cluster.

In one exemplary process for identifying static elements, the computer apparatus traverses each branch from the root element until it splits into subbranches. If the subbranches all end with electronic message terminal characters with one terminal character for each subbranch, then the branch is common across all the electronic messages of the cluster and the computer apparatus labels the token sequence corresponding to the branch as a static element.

The process of identifying iterating elements is similar to the process of identifying static elements. In one example, the computer apparatus locates each branch in the generalized suffix tree that splits into the sub-branches and inspects the terminal character of the branch. Unlike the static detection process where the computer apparatus locates branches that split into the set of terminals matching the set of electronic messages in the cluster, the process of identifying iterating elements involves locating each branch that splits into terminal characters that match all the electronic messages in the given cluster and match at least one of the electronic messages in the given cluster more than once. In some examples, the computer apparatus applies rules to branches, such as minimum token sequence length and a minimum threshold variance of the repeating token sequence across the electronic messages in the given cluster. The minimum token sequence length rule filters out common words (e.g., "the" and "and") and product names that appear frequently in electronic messages. The minimum threshold variance criterion distinguishes iterating sections from static elements that appear infrequently in the electronic messages of the given cluster. For example, an electronic message that contains a product confirmation for a book have the title "Thanks for your purchase" in an iterating section might be incorrectly identified if the same phrase is used elsewhere in the text of the electronic message, but because the token sequence "Thanks for your purchase" appears very infrequently in this section of the electronic messages of the cluster, its variance value in this section would be very low and therefore would not be misidentified as an iterating section of the electronic messages in which it appeared.

The structural elements that are identified by traversing the generalized suffix tree for a given cluster are incorporated into a data structure (referred to herein as a "grammar") that preserves the sequence of the static, optional, and iterating elements in the generalized suffix tree. In some examples, each grammar recursively defines allowable arrangements of the tokens corresponding to the structural elements. The computer apparatus typically stores the cluster grammars in one or more data structures in non-transitory computer-readable memory.

Figure 6D:
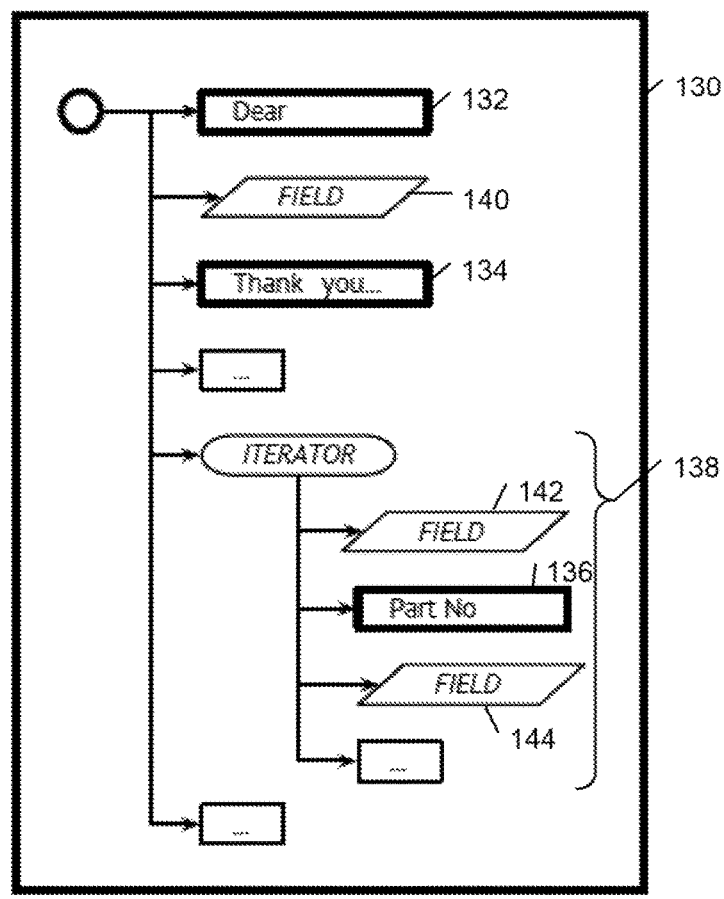
FIG. 6D is a diagrammatic view of a grammar extracted from the generalized suffix tree representation of FIG. 6C.

FIG. 6D shows an example of a grammar 130 that is extracted from the generalized suffix tree representation of FIG. 6C. The grammar preserves the arrangement (e.g., order) of the static elements 132, 134, 136, the optional elements, the iterating elements 138, and the data fields 140, 142, 144.

Referring back to FIG. 5, in addition to determining a respective grammar for each cluster in each of the merchant-specific sets 94, 96 of clusters, the computer apparatus trains one or more classifiers to label the data fields that are determined for each cluster of electronic messages.

In some examples, the computer apparatus selects a training set 102 of electronic messages. In the illustrated example, the training set 102 is selected from the collection of pre-processed messages 84; in other examples the training set 102 is selected from another collection of electronic messages that include product purchase information. In some examples, the electronic messages in the training set 102 are selected without regard to the merchant associated with the electronic messages. As a result, a single training set can be used to train the one or more data field labeling classifiers across a wide variety of different merchants, which increases the scalability of the training process as compared with a training process in which a respective set of classifiers is trained for each merchant.

The computer apparatus or human operator (e.g., a machine learning engineer) identifies features in the training set 102 of electronic messages that will be used to train the one or more classifiers 106-110 (FIG. 5, block 104). In this process, the data fields that are to be labeled by the one or more classifiers are identified in the training electronic messages and used to create the features that will be used to train the one or more classifiers to associate the correct label with the target data fields.

In the illustrated example, three classifiers are built: a price classifier 106, an identifier classifier 108, and an item description classifier.

The price classifier 106 is a machine learning classifier that is trained to label ones of the extracted field tokens with respective price labels in a predetermined price classification taxonomy. In some examples, the price classifier 106 is trained to label price token variants with the following order-level price labels: shipping; tax; total; sub-total; and discount.

In some examples, the computer apparatus identifies candidate price field tokens in the training set 102 of electronic messages (e.g., for U.S. dollar based prices, the computer apparatus looks for a "$" symbol followed by a decimal number consisting of an integer part and a two-digit fractional part separated by the decimal separator "."). For each candidate price, the computer apparatus determines features from the words used in the static token sequence that precedes the candidate price field token. In some examples, the computer apparatus breaks the static token sequence preceding a particular candidate price into two-word phrases (including special character words demarcating the beginning and end of the sequence, such as <start> and <end>) that are used as the features for training the price classifier to label that particular price with the assigned label from the price taxonomy. For example, if the static token sequence preceding an identified price field tokens that is assigned the "total" price label consists of "You paid the total:", the computer apparatus would convert the static token sequence into the following features: "<start> you"; "you paid"; "paid the"; "the total:"; "total: <end>". During the training process, the price classifier automatically learns the weights to assign to the features based on the training data. In some examples, the price classifier 106 is trained according to a naïve Bayes training process.

The identifier classifier 108 is a machine learning classifier that is trained to label respective ones of the extracted field tokens with an identifier label in a predetermined identifier classification taxonomy. In some examples, the identifier classifier 108 is trained to label identifier variants into the following identifier labels: order number; tracking number; and SKU (Stock Keeping Unit).

In some examples, the computer apparatus identifies candidate identifier field tokens (e.g., non-decimal numeric and alphanumeric strings) in the training set 102 of electronic messages. For each candidate identifier, the computer apparatus trains the identifier classifier 108 to classify the candidate identifier based on features that include (i) a token extracted from the selected electronic message that corresponds to a static structural element of the respective grammar that immediately precedes the identifier field token in the selected electronic message, and (ii) characteristics of the identifier field token. In some examples, the computer apparatus breaks the static token sequence preceding a particular candidate identifier into two-word phrases (including special character words demarcating the beginning and end of the sequence, such as <start> and <end>) that are used as the features for training the identifier classifier to label that particular price with the assigned label from the identifier taxonomy. In addition, the computer apparatus uses characteristics of the candidate identifier field token, including the symbol length of the candidate identifier, the percentage of numeric symbols (also referred to as digits) in the candidate identifier, the location of the candidate identifier in the electronic message (e.g., in the subject field in the header of the electronic message, at the top of the body of the electronic message, or at the bottom of the body of the electronic message). During the training process, the identifier classifier 108 automatically learns the weights to assign to the features based on the training data. In some examples, the identifier classifier is 108 trained according to a logistic regression training process.

The item description classifier 110 is a machine learning classifier that is trained to label respective ones of the extracted field tokens as an item description. In some examples, the computer apparatus identifies candidate item description field tokens (e.g., word phrase symbol strings) in the training set 102 of electronic messages. For each candidate item description, the computer apparatus trains the classifier to classify the candidate identifier based on features that include, for example: the percentage of phrases that the candidate item description has in common with a known item description (e.g., an item description in a database of products descriptions, such as a list of products previously purchased by the recipient of the electronic message or a product catalogue associated with the merchant associated with the electronic message); the percentage of phrases that the candidate item description has in common with a compilation of phrases that are known to not be part of product descriptions (e.g., identifier related phrases, such as "Order No.", and order-level price related phrases, such as "Total Price", are examples of phrases that typically are included in the compilation as not corresponding to item descriptions); and the percentage of capitalized symbols in the candidate item description field tokens. During the training process, the item description classifier 110 automatically learns the weights to assign to the features based on the training data. In some examples, the item description classifier 110 is trained according to a logistic regression training process.

In some examples, in addition to building the price classifier 106, the identifier classifier 108, and the item description classifier 110, the computer apparatus also applies heuristics to classify candidate item-level quantity field tokens and candidate item-level price field tokens. An example of an item-level quantity classification heuristic is the magnitude of the numeric field token in an iterating section of an electronic message. An example of an item-level price classification heuristic is a phrase of one or more words (e.g., "item price") that appears in a static token sequence that precedes a candidate price field token in an iterating section of an electronic message.

III. Parsing Electronic Messages with a Structure Learning Parser

Figure 7:
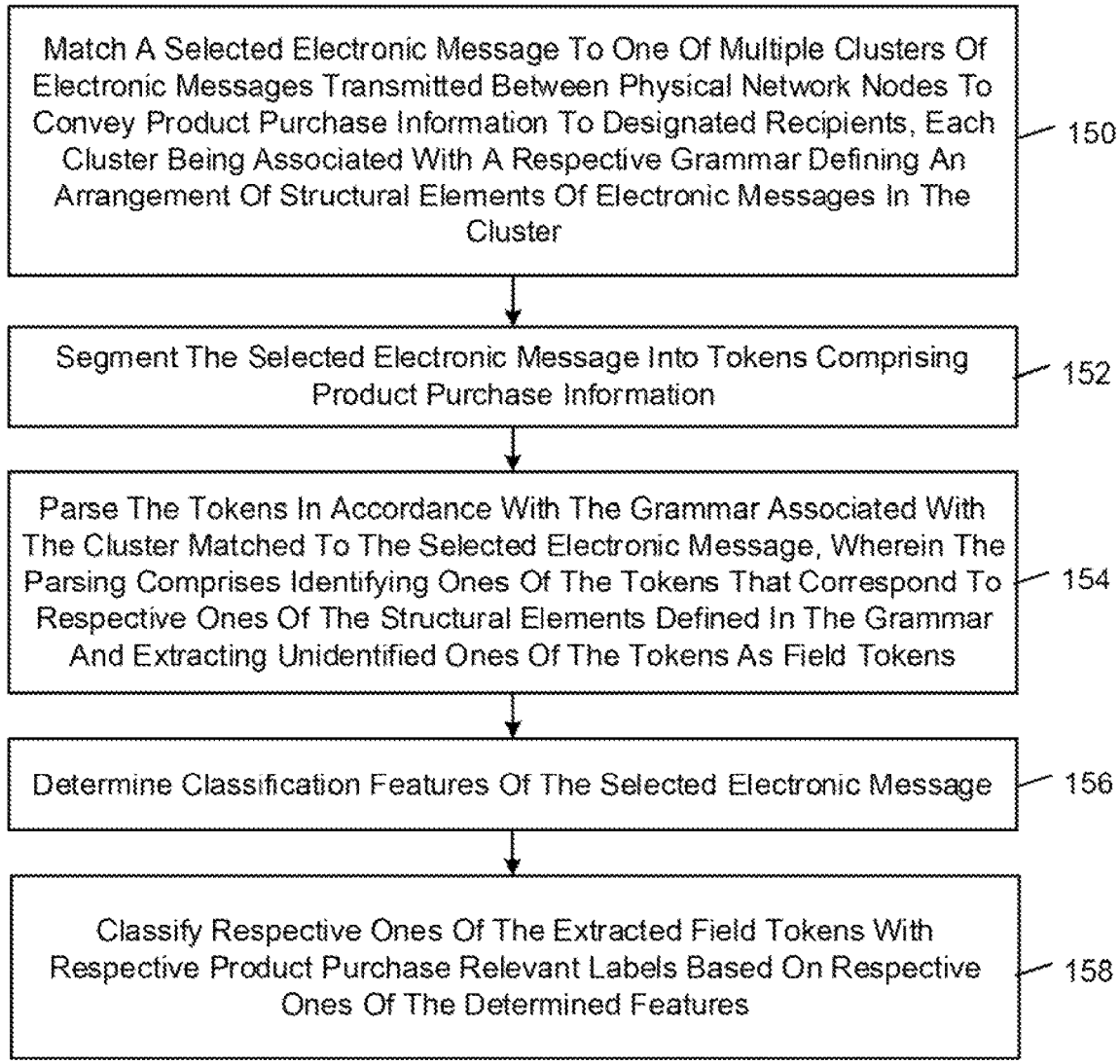
FIG. 7 is a flow diagram of an example of a process of extracting product purchase information from electronic messages.

FIG. 7 shows a method of by which an example of a structure learning parser extracts product purchase information from an electronic message. In the illustrated examples, computer apparatus is programmed to perform the method of FIG. 7.

In accordance with the method of FIG. 7, the computer apparatus matches a selected electronic message to one of multiple clusters of electronic messages transmitted between physical network nodes to convey product purchase information to designated recipients, each cluster being associated with a respective grammar defining an arrangement of structural elements of electronic messages in the cluster (FIG. 7, block 150). The computer apparatus segments the selected electronic message into tokens that include product purchase information (FIG. 7, block 152). The computer apparatus parses the tokens in accordance with the grammar associated with the cluster matched to the selected electronic message, where the parsing process includes identifying ones of the tokens that correspond to respective ones of the structural elements defined in the grammar and extracting unidentified ones of the tokens as field tokens (FIG. 7, block 154). The computer apparatus determines classification features of the selected electronic message (FIG. 7, block 156). The computer apparatus classifies respective ones of the extracted field tokens with respective product purchase relevant labels based on respective ones of the determined features (FIG. 7, block 158). In non-transitory computer-readable memory, the computer apparatus typically stores associations between the product purchase relevant labels and the product purchase information corresponding to the respective ones of the extracted field tokens in one or more data structures (e.g., a database) permitting computer-based generation of actionable purchase history information.

In some examples, the structure learner parser includes a product purchase information token parser that performs the matching, segmenting, and parsing operations of blocks 150-154 of FIG. 7, and a product purchase information token classifier that performs the determining and classifying operations of blocks 156-158 of FIG. 7. In some examples, a software application that programs a computer to perform the matching, segmenting, and parsing operations of blocks 150-154 implements the product purchase information token parser, where a different respective software module includes a respective set of computer-readable instructions for performing the matching, segmenting, and parsing operations. In some examples, a machine learning software application that programs a computer to perform the determining and classifying operations of blocks 156-158 implements the product purchase information token classifier.

Figure 8:
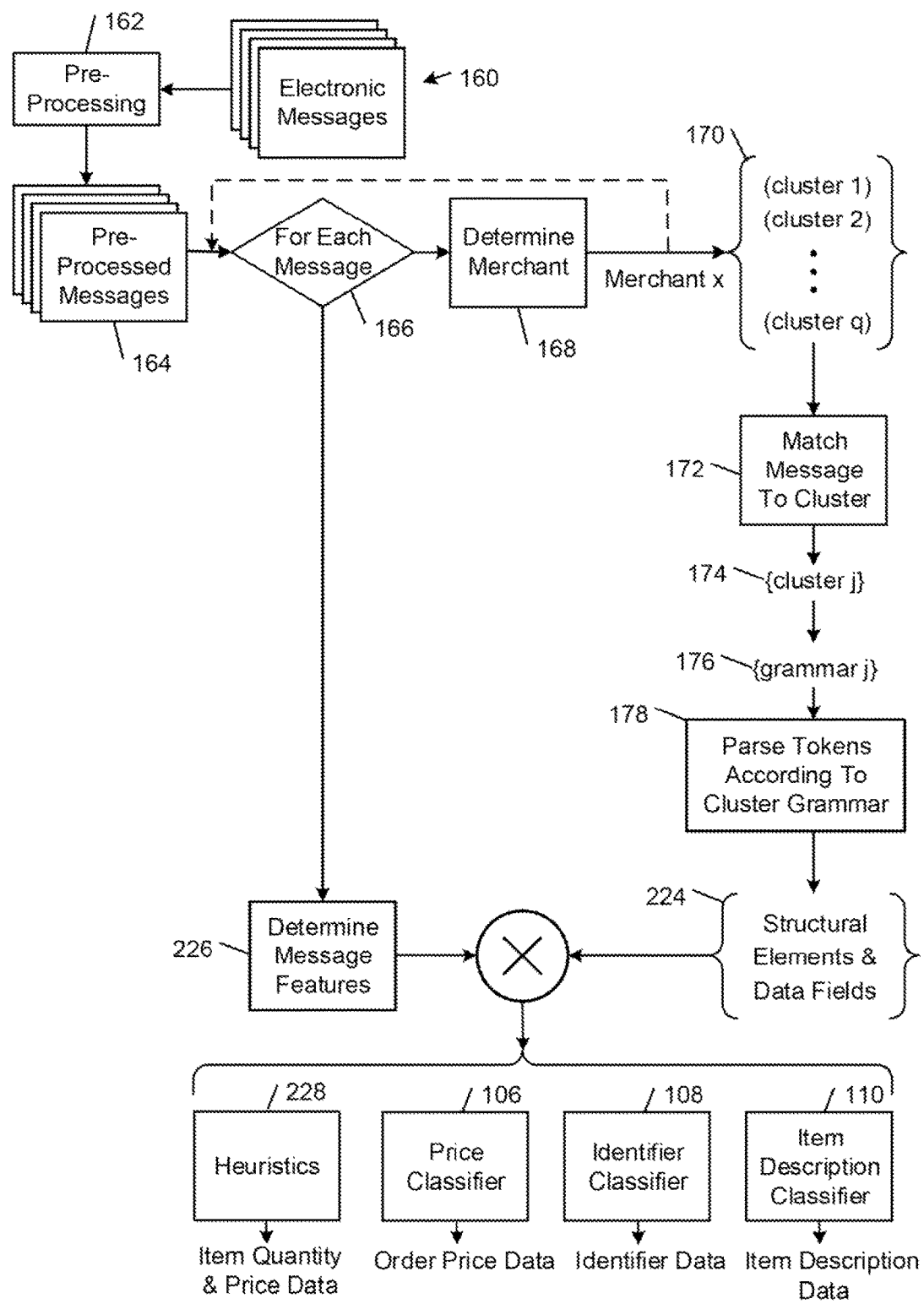
FIG. 8 is a flow diagram of an example of the product purchase information extraction process of FIG. 7.

FIG. 8 shows a flow diagram of an example of the electronic message parsing process of FIG. 7.

In this example, the computer apparatus retrieves from a data store (e.g., a database) electronic messages 160 that have been transmitted between physical network nodes to convey product purchase information to designated recipients. FIG. 9A shows an example 161 of one of the electronic messages 160.

The computer apparatus pre-processes the electronic messages 160 (FIG. 8, block 162). In this process, the computer apparatus tokenizes the text-based contents of the electronic messages by extracting contiguous strings of symbols (e.g., symbols representing alphanumeric characters) separated by white spaces. The contiguous symbol strings typically correspond to words and numbers. The computer apparatus then replaces tokens that match patterns for integers and real numbers (typically prices) in the electronic messages 160 with wildcard tokens. FIG. 9B shows an example of a pre-processed version 163 of the electronic message 161 in which integers have been replaced with the wildcard token "INT" and real numbers have been replaced with the wildcard token "FLOAT". The replacement of the variable integer and real number elements of each electronic message with wildcard tokens improves the detection of iterating elements of the electronic messages.

For each of the pre-processed messages 164 (FIG. 8, block 166), the computer apparatus attempts to determine a merchant that is associated with the electronic message (FIG. 8, block 168). For some types of electronic messages, the computer apparatus attempts to determine the merchant from header information that includes supplemental information about the electronic message. For example, an electronic mail (e-mail) message includes header information that indicates the sender, the recipient, and the subject of the electronic mail message, and a text message typically includes a Sender ID that indicates the sender of the message. In some cases, the computer apparatus may be able to determine the merchant from the sender or subject contained in the header information. In some cases, the computer apparatus may attempt to determine the merchant from the content of the electronic message.

Based on the determined merchant that is identified as being associated with a respective one of the electronic messages, the computer apparatus attempts to match the electronic message to one of multiple clusters of electronic messages 170 that is associated with the determined merchant. In some examples, the set 170 of clusters corresponds to one of the merchant-specific sets 94, 96 of electronic message clusters into which the electronic messages 84 were grouped in the structure learning parser building process described above in connection with FIG. 5.

After determining the set 170 of clusters of electronic messages that is associated with the merchant associated with the electronic message, the computer apparatus matches the electronic message to a respective one of the clusters in the set 170 of clusters (FIG. 8, block 172). In some examples, the computer apparatus associating each of the clusters in the determined set 170 with a respective similarity score that indicates a degree of similarity between contents of the selected electronic message and contents of the electronic messages of the cluster. The computer apparatus then matches the electronic message to the cluster 174 in the set 170 that is associated with a highest one of the similarity scores.

In some examples, each similarity score compares similarity and diversity of the contents of the electronic message and contents of a respective one of the electronic messages of the associated cluster. In some examples, measures of content similarity compare similarity and diversity of the contents of pairs of electronic messages. In some of these examples, the similarity measure corresponds to the Jaccard similarity coefficient, which measures similarity between two electronic messages based on the size of the intersection divided by the size of the union of features of the electronic messages. In some of these examples, the computer apparatus extracts lines of content (i.e., whole lines, as opposed to individual words in the lines) from each electronic message as the features that are compared, and measures similarities between electronic messages using line-based comparisons of the extracted content. This line-based feature matching approach improves the accuracy of the clustering process by narrowing the range of matches between electronic messages.

Figure 9C:
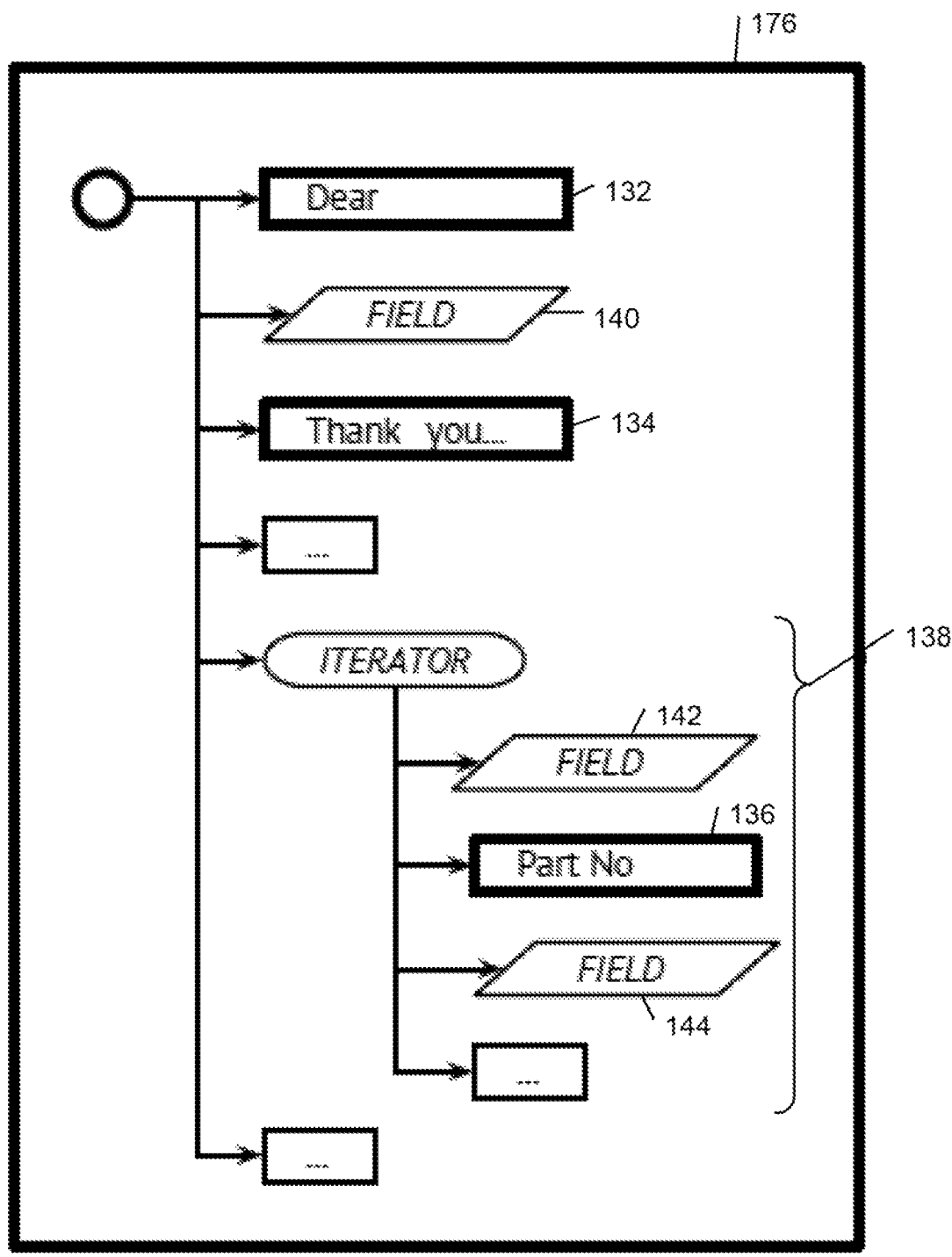
FIG. 9C is a diagrammatic view of a grammar matched to the pre-processed electronic message of FIG. 9B.

As explained above, each cluster in the matched merchant-specific set 170 of clusters is associated with a respective grammar that defines an arrangement of structural elements of electronic messages in the cluster. Based on this association, the computer apparatus determines the grammar 176 that is associated with the cluster 174 that is matched to the electronic message. FIG. 9C shows an example of the grammar 176 that is matched to the electronic message. In the illustrated example, the grammar 176 corresponds to the grammar 130 shown in FIG. 6D. As explained above, the grammar preserves the arrangement (e.g., order) of the static elements 132, 134, 136, the optional elements, the iterating elements 138, and the data fields 140, 142, 144. In some examples, the grammar recursively defines allowable arrangements of the tokens corresponding to the structural elements.

After determining the grammar 176 that is associated with the cluster 174 that is matched to the electronic message, the computer apparatus parses the electronic message according to the determined grammar 176 (FIG. 8, block 178). In this process, the computer apparatus matches the sequence of structural elements in the grammar to the tokens identified in the pre-processed version of the electronic message. The result is an ordered arrangement of tokens 224 matched to respective ones of the structural elements of the grammar and a set of unidentified ones of the tokens that are extracted as data fields.

Figure 9D:
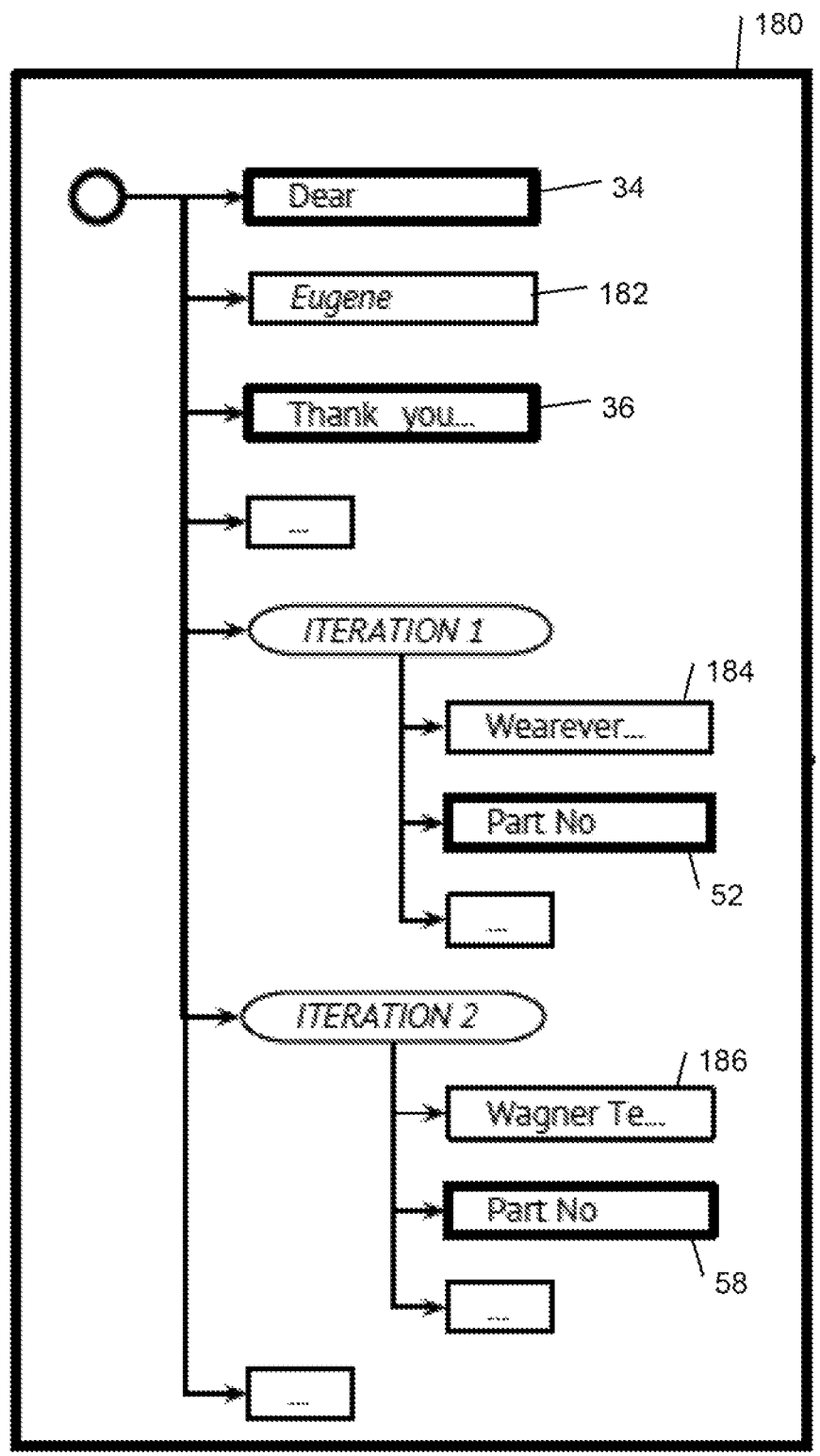
FIG. 9D is a diagrammatic view of a syntax tree parsed from the pre-processed electronic message of FIG. 9B according to the grammar of FIG. 9C.

FIG. 9D shows an example of an abstract syntax tree 180 (AST) of structural elements 34, 36, 52, and 58 (which correspond to the structural elements shown in FIG. 3) and data fields 182, 184, 186 that have been parsed from the pre-processed electronic message 163 of FIG. 9B according to the grammar 176 of FIG. 9C.

FIG. 9E shows an example of a visualization 182 of the electronic message 161 of FIG. 9A showing data fields 184-222 that have been parsed from the pre-processed electronic message 163 of FIG. 9B as a result of traversing the syntax tree 180 of FIG. 9D and extracting the unidentified ones of the tokens that do not match any of the structural elements in the grammar as data fields.

Referring back to FIG. 8, in addition to parsing tokens in the electronic message according to the grammar (FIG. 8, block 178), the computer apparatus also determines a respective set of additional features from each electronic message (FIG. 8, block 226). The determined features correspond to the features that are extracted during the training process described above.

After the tokens have been parsed and the additional features have been extracted from the pre-processed version of the electronic message (FIG. 8, blocks 178, 226), the computer apparatus applies respective sets of the parsed tokens and extracted features to the order-level price classifier 106, the identifier classifier 108, the item description classifier 110, and the item-level classification heuristics 228 described above. In the illustrated examples, the price classifier 106 labels the extracted candidate price data field tokens with respective ones the following order-level price labels: shipping; tax; total; sub-total; and discount. In the illustrated examples, the identifier classifier 108 labels respective ones of the extracted candidate price data field tokens with respective ones of the following identifier labels: order number; tracking number; and SKU. In the illustrated examples, the item description classifier labels respective ones of the extracted data field tokens as item descriptions. In the illustrated examples, the computer apparatus applies the item-level classification heuristics to label respective ones of the extracted data field tokens item-level quantity and price labels.

After classification, the computer apparatus outputs an extracted set of price data, identifier data, item description data, and item-level quantity and price data for each electronic message. The computer apparatus typically stores this product purchase information in non-transitory computer-readable memory. For example, the product purchase information may be stored in one or more data structures that include associations between the product purchase relevant labels and the product purchase information of the respective ones of the extracted product purchase data field tokens.

D. Extracted Product Purchase Information Applications

The extracted product purchase information may be used in a wide variety of useful and tangible real-world applications. For example, for individual users, the extracted product purchase information is processed, for example, to display information about the users' purchases, including information for tracking in-transit orders, information for accessing purchase details, and aggregate purchase summary information. For advertisers, the extracted product purchase information is processed, for example, to assist in targeting advertising to consumers based on their purchase histories. For market analysts, the extracted product purchase information is processed to provide, for example, anonymous item-level purchase detail across retailers, categories, and devices.

Figure 11:
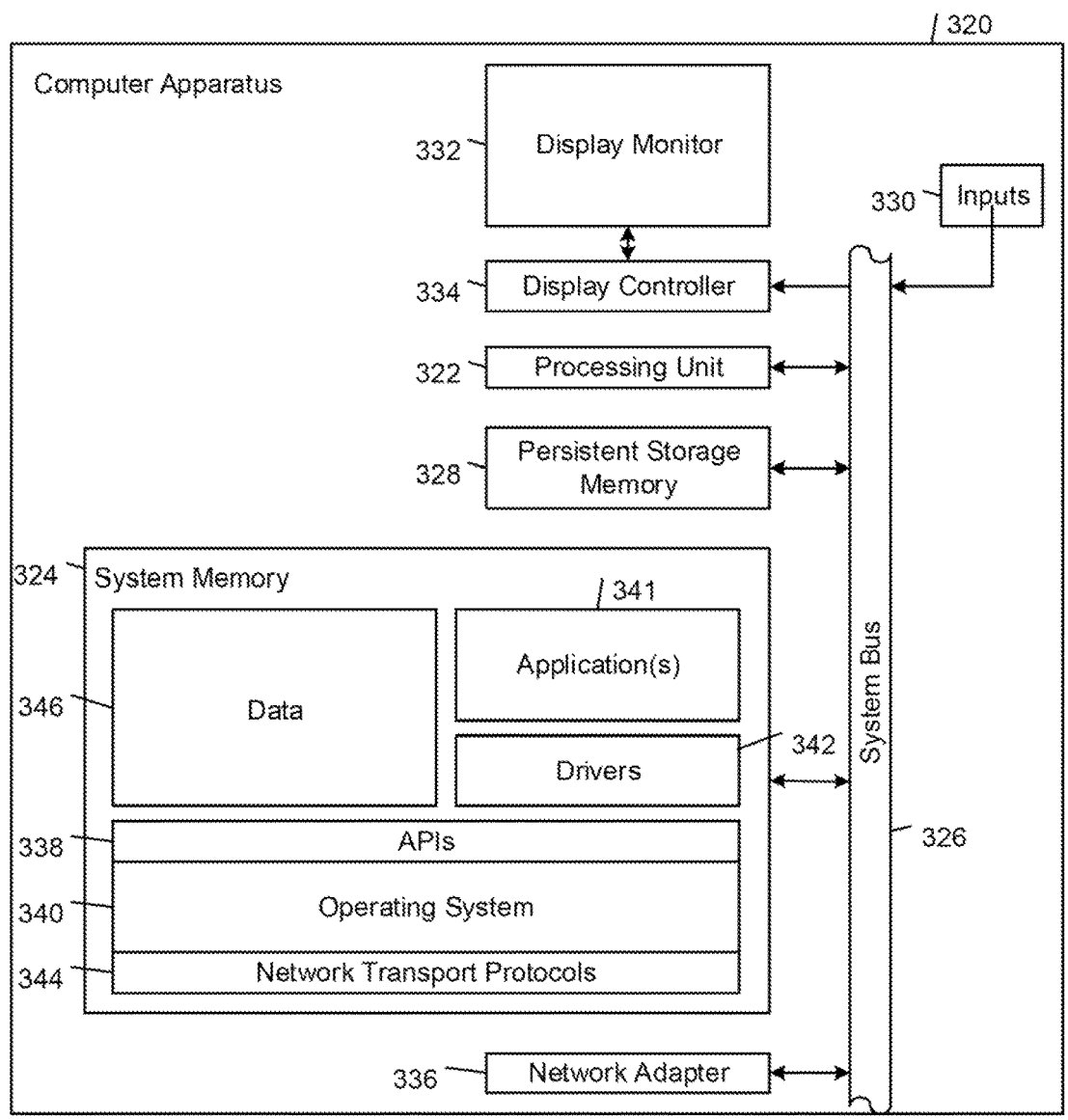
FIG. 11 is a block diagram of an example of computer apparatus.

FIG. 11 shows an exemplary embodiment of computer apparatus that is implemented by a computer system 320. The computer system 320 includes a processing unit 322, a system memory 324, and a system bus 326 that couples the processing unit 322 to the various components of the computer system 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer system 320, and a random access memory (RAM). The system bus 326 may be a memory bus, a peripheral bus or a local bus, and may be compatible with any of a variety of bus protocols, including PCI, VESA, Microchannel, ISA, and EISA. The computer system 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

Other exemplary applications of the extracted product purchase information are described in, for example, U.S. Patent Publication No. 20130024924 and U.S. Patent Publication No. 20130024525.

3. Exemplary Computer Apparatus

Computer apparatus are specifically programmed to provide improved processing systems for performing the functionality of the methods described herein. In some examples, the process of building a structure learning parser and the process of parsing electronic messages with a structure learning parser are performed by separate and distinct computer apparatus. In other examples, the same computer apparatus performs these processes.

FIG. 10 shows an exemplary embodiment of computer apparatus that is implemented by a computer system 320. The computer system 320 includes a processing unit 322, a system memory 324, and a system bus 326 that couples the processing unit 322 to the various components of the computer system 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer system 320, and a random access memory (RAM). The system bus 326 may be a memory bus, a peripheral bus or a local bus, and may be compatible with any of a variety of bus protocols, including PCI, VESA, Microchannel, ISA, and EISA. The computer system 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer system 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer system 320 also may include other input/output hardware (e.g., peripheral output devices, such as speakers and a printer). The computer system 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer system 320 to perform one or more of the process of building a structure learning parser and the process of parsing electronic messages with a structure learning parser, drivers 342 (e.g., a GUI driver), network transport protocols 344, and data 346 (e.g., input data, output data, program data, a registry, and configuration settings).

In some embodiments, the one or more server network nodes of the product providers 18, 42, and the recommendation provider 44 are implemented by respective general-purpose computer systems of the same type as the client network node 320, except that each server network node typically includes one or more server software applications.

In other embodiments, one or more of the product purchase information provider 12, the product merchants 14, the product delivery providers 16, the message providers 18, and the product purchase information consumers 20 shown in FIG. 1 are implemented by server network nodes that correspond to the computer apparatus 320.

4. Conclusion

The embodiments described herein provide improved systems, methods, and computer-readable media for extracting product purchase information from electronic messages.

Other embodiments are within the scope of the claims.

The invention claimed is:

1. A method performed by one or more computer systems, comprising:
for each of one or more selected purchase-related electronic messages, segmenting tokens from the selected electronic message;
from multiple definitions each defining a respective arrangement of structural elements that is shared by a respective set of purchase-related electronic messages, selecting a respective one of the definitions corresponding to one of the respective sets of purchase-related electronic messages that is matched to the selected electronic message;
parsing the tokens segmented from the selected electronic message in accordance with the selected definition, wherein the parsing comprises building an abstract syntax tree representation of an ordered arrangement of structural tokens segmented from the selected electronic message that match structural elements in the selected definition and non-structural tokens segmented from the selected electronic message that do not match any of the structural elements in the selected definition, and the parsing further comprises traversing the abstract syntax tree representation to extract the non-structural tokens;
determining classification features based on the ordered arrangement of one or more of the structural tokens and one or more of the non-structural tokens;
classifying, by at least one machine learning classifier, one or more of the non-structural tokens with respective product purchase relevant labels based on the determined classification features; and
storing associations between the product purchase relevant labels and the non-structural tokens in a non-transitory computer-readable memory.

2. The method of claim 1, wherein the parsing comprises producing a tree structure representing the ordered sequence of structural and non-structural tokens.

3. The method of claim 2, wherein the tree structure is an abstract syntax tree.

4. The method of claim 1, wherein the classifying comprises classifying each of a plurality of the non-structural tokens as one of: a price in a predetermined price classification taxonomy; an identifier in a predetermined identifier classification taxonomy; and an item description.

5. The method of claim 1, wherein, for each set of purchase-related electronic messages, the structural elements in the selected definition comprise static structural elements each of which appears in all of the purchase-related electronic messages in the respective set.

6. The method of claim 5, wherein:
the parsing comprises ascertaining the non-structural tokens that correspond to prices;
the determining comprises choosing as price classification features the structural tokens corresponding to static structural elements that immediately precede the non-structural tokens ascertained to correspond to prices; and
the classifying comprises labeling the non-structural tokens ascertained to correspond to prices based on the respective price classification features.

7. The method of claim 6, wherein the price classification features comprise words in the structural tokens corresponding to static structural elements that immediately precede the non-structural tokens ascertained to correspond to prices.

8. The method of claim 5, wherein:
the parsing comprises ascertaining the non-structural tokens that correspond to identifiers;
the determining comprises choosing as identifier classification features the structural tokens corresponding to static structural elements that immediately precede the non-structural tokens ascertained to correspond to identifiers; and
the classifying comprises labeling the non-structural tokens ascertained to correspond to identifiers based on the respective identifier classification features.

9. The method of claim 8, wherein the identifier classification features comprise: words in the structural tokens corresponding to structural elements that immediately precede the non-structural tokens ascertained to correspond to identifiers; and characteristics of the non-structural tokens ascertained to correspond to identifiers.

10. The method of claim 1, wherein:
the parsing comprises ascertaining the non-structural tokens that correspond to item descriptions;
the determining comprises choosing as item description classification features characteristics of the non-structural tokens ascertained to correspond to item descriptions; and
the classifying comprises labeling the non-structural tokens ascertained to correspond to item descriptions based on the chosen item description classification features.

11. The method of claim 1, wherein the structural elements defined in the selected definition comprise iterating static structural elements each of which appears in all of the purchase-related electronic messages in the respective set and repeats in a plurality of the purchase-related electronic messages in the respective set.

12. The method of claim 11, wherein:
the parsing comprises ascertaining as iterator related non-structural tokens the non-structural tokens that are associated with the structural tokens that correspond to the iterating static structural elements in the selected definition;
the determining comprises choosing as iterator classification features the structural tokens corresponding to iterating static structural elements adjacent the non-structural tokens ascertained as iterator related non-structural tokens; and the classifying comprises labeling the non-structural tokens ascertained as iterator related non-structural tokens based on the respective iterator classification features.

13. The method of claim 12, wherein the classifying comprises classifying each of the non-structural tokens ascertained as iterator related non-structural tokens as one of: a price; a quantity; and an item description.

14. The method of claim 1, further comprising, before the selecting, preprocessing the selected electronic message, wherein the preprocessing comprises replacing segmented tokens that match patterns for numbers with wildcard tokens; and wherein the parsing is performed on the preprocessed electronic message.

15. The method of claim 14, wherein the selecting comprises matching the preprocessed electronic message to a selected one of the sets of purchase-related electronic messages associated with the respective definitions, and the matching comprises comparing the preprocessed electronic message with preprocessed versions of the purchase-related messages in each set based on whole line-based comparisons of the preprocessed contents of the preprocessed electronic message with each of the preprocessed versions of the purchase-related messages in each set.

16. The method of claim 1, wherein the aggregated data permits computer-based generation of commercially relevant data sets in response to respective queries.

17. The method of claim 1, further comprising, by computer apparatus, generating product purchase summary information based on the aggregated data, and transmitting data for displaying a visualization of the product purchase summary information on a physical network node.

18. An apparatus, comprising non-transitory memory storing processor-readable instructions, and one or more processors coupled to the memory, configured to execute the instructions, and based at least in part on the execution of the instructions configured to perform operations comprising:
for each of one or more selected purchase-related electronic messages,
segmenting tokens from of the identified purchase-related electronic message;
from multiple definitions each defining a respective arrangement of structural elements that is shared by a respective set of purchase-related electronic messages, selecting a respective one of the definitions corresponding to one of the respective sets of purchase-related electronic messages that is matched to the selected electronic message;
parsing the tokens segmented from the selected electronic message in accordance with the selected definition, wherein the parsing comprises building an abstract syntax tree representation of an ordered arrangement of structural tokens segmented from the selected electronic message that match structural elements in the selected definition and non-structural tokens segmented from the selected electronic message that do not match any of the structural elements in the selected definition, and the parsing further comprises traversing the abstract syntax tree representation to extract the non-structural tokens;
determining classification features based on the ordered arrangement of one or more of the structural tokens and one or more of the non-structural tokens;
classifying, by at least one machine learning classifier, one or more of the non-structural tokens with respective product purchase relevant labels based on the determined classification features; and
storing associations between the product purchase relevant labels and the non-structural tokens in a non-transitory computer-readable memory.

19. At least one non-transitory computer-readable medium having processor-readable program code embodied therein, the processor-readable program code adapted to be executed by a processor to implement a method comprising:
for each of one or more selected purchase-related electronic messages,
segmenting tokens from of the selected electronic message;
from multiple definitions each defining a respective arrangement of structural elements that is shared by a respective set of purchase-related electronic messages, selecting a respective one of the definitions corresponding to one of the respective sets of purchase-related electronic messages that is matched to the selected electronic message;
parsing the tokens segmented from the selected electronic message in accordance with the selected definition, wherein the parsing comprises building an abstract syntax tree representation of an ordered arrangement of structural tokens segmented from the selected electronic message that match structural elements in the selected definition and non-structural tokens segmented from the selected electronic message that do not match any of the structural elements in the selected definition, and the parsing further comprises traversing the abstract syntax tree representation to extract the non-structural tokens;
determining classification features based on the ordered arrangement of one or more of the structural tokens and one or more of the non-structural;
classifying, by at least one machine learning classifier, one or more of the non-structural tokens with respective product purchase relevant labels based on the determined classification features; and
storing associations between the product purchase relevant labels and the non-structural tokens in a non-transitory computer-readable memory.

20. An apparatus comprising at least one non-transitory memory storing processor-readable instructions, and at least one processor coupled to the memory, configured to execute the instructions, and based at least in part on the execution of the instructions configured to implement:
a product purchase information token parser configured to segment contents of a selected electronic message into tokens,
from multiple definitions each defining a respective arrangement of structural elements that is shared by a respective set of purchase-related electronic messages, selecting a respective one of the definitions corresponding to one of the respective sets of purchase-related electronic messages that is matched to the selected electronic message, and
parse the tokens segmented from the selected electronic message in accordance with the selected definition, wherein the parsing comprises building an abstract syntax tree representation of an ordered arrangement of structural tokens segmented from the selected electronic message that match structural elements in the selected definition and non-structural tokens segmented from the selected electronic message that do not match any of the structural elements in the selected definition, and the parsing further comprises traversing the abstract syntax tree representation to extract the non-structural tokens;

a product purchase information token classifier configured to
- determine classification features based on the ordered arrangement of one or more of the structural tokens and one or more of the non-structural, and
- classify one or more of the non-structural tokens with respective product purchase relevant labels based on the determined classification features; and non-transitory computer-readable memory storing associations between the product purchase relevant labels and the non-structural tokens in one or more data structures permitting computer-based generation of actionable purchase history information.

\* \* \* \* \*